US012699267B2

(12) United States Patent
Hagen

(10) Patent No.: US 12,699,267 B2
(45) Date of Patent: Aug. 4, 2026

(54) PROJECTION ARRANGEMENT COMPRISING A LAMINATED PANE

(71) Applicant: SAINT-GOBAIN GLASS FRANCE, Courbevoie (FR)

(72) Inventor: Jan Hagen, Herzogenrath (DE)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 276 days.

(21) Appl. No.: 18/709,301

(22) PCT Filed: Oct. 20, 2022

(86) PCT No.: PCT/EP2022/079207
§ 371 (c)(1),
(2) Date: May 10, 2024

(87) PCT Pub. No.: WO2023/083578
PCT Pub. Date: May 19, 2023

(65) Prior Publication Data
US 2025/0044587 A1 Feb. 6, 2025

(30) Foreign Application Priority Data

Nov. 12, 2021 (EP) ..................................... 21207872

(51) Int. Cl.
*G02B 27/01* (2006.01)
*B32B 17/10* (2006.01)
(Continued)

(52) U.S. Cl.
CPC .... *G02B 27/0101* (2013.01); *B32B 17/10036* (2013.01); *B32B 17/10201* (2013.01);
(Continued)

(58) Field of Classification Search
None
See application file for complete search history.

(56) References Cited

U.S. PATENT DOCUMENTS

2017/0242247 A1 8/2017 Tso et al.
2018/0149867 A1 5/2018 Kremers et al.
(Continued)

FOREIGN PATENT DOCUMENTS

CN          113071165 A     7/2021
DE   10 2014 220189 A1     4/2016
(Continued)

OTHER PUBLICATIONS

International Search Report as issued in International Patent Application No. PCT/EP2022/079207, dated Apr. 11, 2023.
(Continued)

*Primary Examiner* — Robert E. Tallman
(74) *Attorney, Agent, or Firm* — CUSHMAN PARTNERS, LLC

(57) ABSTRACT

A projection arrangement includes a laminated pane that includes an inner and outer panes are connected to one another via a thermoplastic intermediate layer, a reflective layer which is arranged between the outer pane and the inner pane in at least one display region of the laminated pane, and a reflection-increasing coating which is arranged at least within the display region on an interior-side surface of the inner pane facing away from the thermoplastic intermediate layer, and a projector of which the radiation is predominantly p-polarized and which is directed toward the display region and wherein the interior-side surface of the inner pane is the face of the laminated pane closest to the projector. The reflection-increasing coating includes an optically high-refractive layer having a refractive index of greater than or equal to 1.9 and at an optically low-refractive layer having a refractive index of less than or equal to 1.6.

20 Claims, 6 Drawing Sheets

Figure 1:
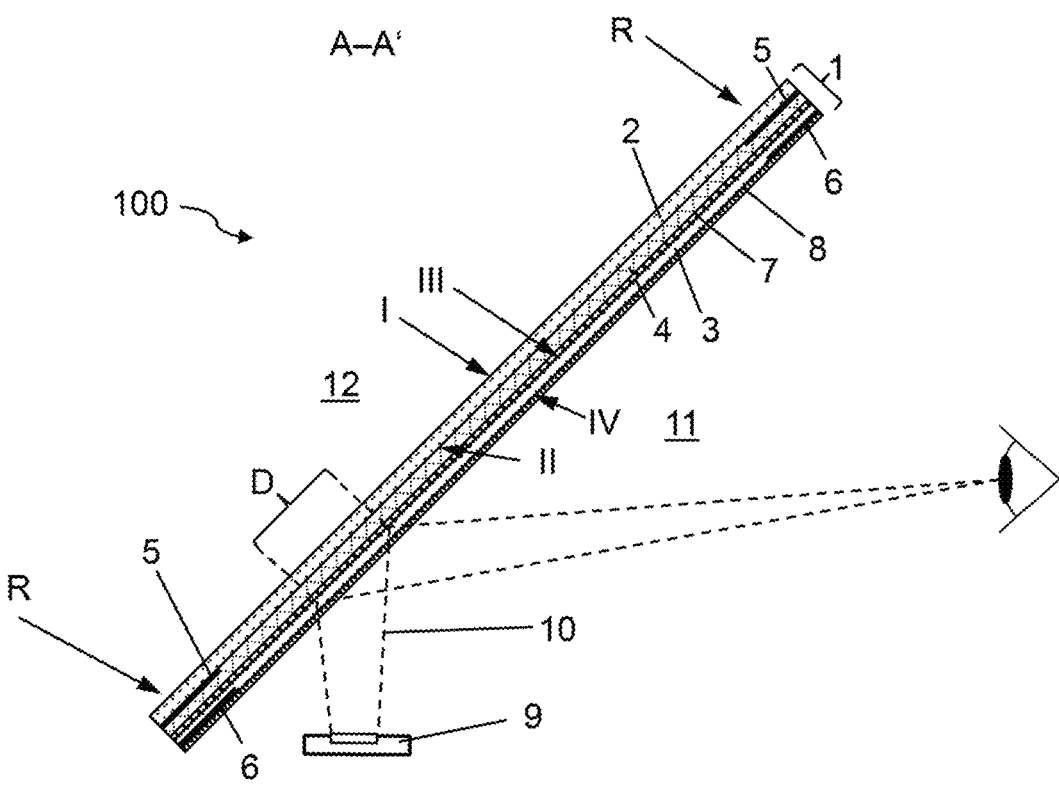

(51) Int. Cl.

| | |
|---|---|
| *B60J 1/00* | (2006.01) |
| *B60J 1/02* | (2006.01) |
| *C03C 17/36* | (2006.01) |

(52) U.S. Cl.

CPC ................. *B60J 1/001* (2013.01); *B60J 1/02* (2013.01); *C03C 17/3626* (2013.01); *C03C 17/3644* (2013.01); *C03C 17/3649* (2013.01); *C03C 17/3657* (2013.01); *C03C 17/3681* (2013.01); *B32B 2255/20* (2013.01); *B32B 2605/00* (2013.01); *C03C 2217/213* (2013.01); *C03C 2217/216* (2013.01); *C03C 2217/256* (2013.01); *C03C 2217/261* (2013.01); *C03C 2217/281* (2013.01); *G02B 2027/012* (2013.01); *G02B 2027/0194* (2013.01)

(56) References Cited

U.S. PATENT DOCUMENTS

| | | | | |
|---|---|---|---|---|
| 2018/0348513 A1* | 12/2018 | Fischer | ............... | C03C 17/3639 |
| 2019/0064516 A1 | 2/2019 | Wagner et al. | | |
| 2022/0250972 A1* | 8/2022 | Bronstein | ........... | C03C 17/3681 |
| 2023/0375830 A1* | 11/2023 | Tso | .................. | B32B 17/10761 |
| 2024/0010071 A1* | 1/2024 | Schulz | .............. | B32B 17/10091 |
| 2024/0025156 A1 | 1/2024 | Jiang et al. | | |
| 2025/0044588 A1* | 2/2025 | Hagen | ............... | B32B 17/10651 |

FOREIGN PATENT DOCUMENTS

| | | | |
|---|---|---|---|
| EP | 0 844 507 | A1 | 5/1998 |
| EP | 1 880 243 | A2 | 1/2008 |
| EP | 1 800 855 | B1 | 2/2013 |
| WO | WO 2006/122305 | A2 | 11/2006 |
| WO | WO 2009/071135 | A1 | 6/2009 |
| WO | WO 2019/046157 | A1 | 3/2019 |
| WO | WO 2019/179682 | A1 | 9/2019 |
| WO | WO 2019/179683 | A1 | 9/2019 |
| WO | WO 2019/206493 | A1 | 10/2019 |
| WO | WO 2021/104800 | A1 | 6/2021 |
| WO | WO 2021/209201 | A1 | 10/2021 |

OTHER PUBLICATIONS

Neumann, A., "Simulation-Based Metrology for Testing Head-Up Displays," Dissertation at the Informatics Institute of Munich Technical University (Munich: University Library of Munich TU, 2012), in particular chapter 2 "The Head-Up Display", (2012), Retrieved from the Internet: URL: <https://mediatum.ub.turn.de/1079689?id=1079689&change_language=en>. (English abstract on p. 5 of document).

\* cited by examiner

PROJECTION ARRANGEMENT COMPRISING A LAMINATED PANE

CROSS-REFERENCE TO RELATED APPLICATIONS

This application is the U.S. National Stage of PCT/EP2022/079207, filed Oct. 20, 2022, which in turn claims priority to European patent application number 21 207 872.9 filed Nov. 12, 2021. The content of these applications are incorporated herein by reference in their entirety.

The invention relates to a projection arrangement comprising a laminated pane, to a method for the production thereof, and to the use thereof.

Modern automobiles are increasingly equipped with so-called head-up displays (HUDs). With a projector, typically in the area of the dashboard, images are projected onto the windshield, reflected there, and perceived by the driver as a virtual image behind the windshield (as seen by the driver). Thus, important information can be projected into the field of vision of the driver, for example, the current travel speed, navigation messages or warnings that the driver can perceive without having to turn his gaze away from the road. Head-up displays can accordingly contribute substantially to increasing traffic safety.

HUD projectors typically irradiate the windshield at an angle of incidence of approximately 65°, which results from the installation angle of the windshield and the positioning of the projector in the vehicle. This angle of incidence is close to the Brewster angle for an air-glass transition (about 56.5° for soda-lime glass). Common HUD projectors transmit s-polarized radiation, which is effectively reflected from the glass surfaces at such an angle of incidence. In this context, the problem arises that the projector image is reflected on both external surfaces of the windshield. As a result, in addition to the desired main image, a slightly offset secondary image also occurs, the so-called ghost image. The problem is usually mitigated by arranging the surfaces at an angle to one another, in particular by using a wedge-like intermediate layer for laminating the windshields designed as a laminated pane, so that the main image and the ghost image are superimposed on one another. Laminated glasses with wedge films for HUDs are known, for example, from WO 2009/071135 A1, EP1800855B1 or EP1880243A2.

The wedge films are costly, and therefore the production of such a laminated pane for an HUD is quite cost-intensive. There is therefore a need for HUD projection arrangements which manage with windshields without wedge films. It is thus possible, for example, to operate the HUD projector with p-polarized radiation which is not substantially reflected at the pane surfaces. As a reflection surface for the p-polarized radiation, the windshield instead has a reflection coating, in particular with metallic and/or dielectric layers. HUD projection arrangements of this type are known, for example, from DE102014220189A1, US201724227A1, WO2019046157A1, WO2019179682A1 and WO2019179683A1.

However, the reflection of p-polarized radiation is only completely suppressed on glass surfaces if the angle of incidence corresponds exactly to the Brewster angle. Since the typical angle of incidence of approximately 65° is close to the Brewster angle, but deviates significantly from it, a certain residual reflection of the projector radiation on the glass surfaces results. While the reflection at the outer-side surface of the outer pane is weakened as a result of the radiation reflection at the reflection coating, in particular the reflection at the interior-side surface of the inner pane can occur as weak, yet nevertheless disturbing ghost images. In addition, the angle of incidence of 65° relates only to a point of the windshield. However, since the HUD projector irradiates a larger HUD region on the windshield, even larger angles of incidence of, for example, up to 68° or even up to 75° may occur locally. Since the deviation from the Brewster angle is even more pronounced there, the ghost image also occurs more intensely. In addition, a tendency of the automobile manufacturers to make the windshields flatter should be noted. The angle of incidence, and thus also the deviation from the Brewster angle, is thereby greater.

WO2019179682A1, WO2019179683A1, WO2019206493A1 and US20190064516A1 disclose windshields for HUD projection arrangements which are provided with an anti-reflection coating on the interior-side surface in order to reduce the reflectance of the interior-side surface.

EP0844507A1 discloses a further HUD projection arrangement, wherein a windshield is irradiated with p-polarized radiation. In order to adapt the Brewster angle to the angle of incidence and thereby to avoid residual reflection at the surface of the pane, an optically high-refractive coating ("Brewster's angle regulating film") is applied on the interior-side surface of the inner pane. The coating is formed from titanium oxide and sputtered onto the pane surface.

WO2021209201 discloses a projection arrangement for an HUD having a reflective layer between an outer pane and an inner pane of a laminated pane and a high-refractive layer which is arranged on a surface of the inner pane facing away from the intermediate space of the laminated pane. The high-refractive layer comprises precisely one layer having a refractive index of 1.9 or higher. The high-refractive layer can also have more than one layer having a refractive index of 1.9 or higher. The reflective layer can optionally contain an electrically conductive layer which primarily increases the reflection of visible light.

US2017242247 discloses a projection arrangement for an HUD with a reflection coating which contains 2 metallic layers.

US20180149867A1 discloses a projection arrangement for an HUD with a windshield having a wedge-shaped thermoplastic intermediate layer.

CN113071165A shows a projection arrangement with a laminated pane, which preferably has a wedge-shaped thermoplastic intermediate layer and a reflection coating, wherein the reflection coating has at least 3 metallic layers. The high number of metallic layers is required in order to reduce the passage of IR radiation through the laminated pane.

The requirements in the automotive sector on coatings in vehicle windows, in particular windshields, are also growing increasingly. In addition to the suitability for being able to reflect high proportions of p-polarized radiation without interfering secondary images, the coatings should also fulfill further functions where possible, for example should enable the heatability of the vehicle window or should contribute to a reduction in the entry of heat radiation from the external environment.

The object of the present invention is to provide an improved projection arrangement, wherein the image is generated by the reflection of predominantly p-polarized radiation on a laminated pane, and wherein the intensity of the reflected p-polarized radiation is amplified without the intensity of double images increasing.

The object of the present invention is achieved according to the invention by a projection arrangement according to claim 1. Preferred embodiments are apparent from the dependent claims.

According to the invention, a projection arrangement is described which is suitable in particular for a head-up display (HUD). The projection arrangement comprises at least one laminated pane and a projector. The laminated pane comprises at least one outer pane and one inner pane which are connected to one another via a thermoplastic intermediate layer. A reflective layer is arranged at least in a display region of the laminated pane and between the outer pane and the inner pane. A reflection-increasing coating is arranged at least within the display region on an interior-side surface of the inner pane facing away from the thermoplastic intermediate layer. In a view through the laminated pane, the reflection-increasing coating covers the reflective layer at least partially and preferably completely in the viewing direction from the inner pane to the outer pane and is particularly preferably arranged congruently with it The radiation of the projector is predominantly p-polarized. The projector is directed toward the display region of the laminated pane. The interior-side surface of the inner pane is the face of the laminated pane closest to the projector.

The reflection-increasing coating comprises at least one optically high-refractive layer having a refractive index of greater than or equal to 1.9 and at least one optically low-refractive layer having a refractive index of less than or equal to 1.6.

The reflective layer is suitable for reflecting the p-polarized radiation of the projector to at least 5%. In this order, the reflective layer also comprises a first dielectric layer or layer sequence, a first electrically conductive layer based on silver, a second dielectric layer or layer sequence, a second electrically conductive layer based on silver and a third dielectric layer or layer sequence. According to the invention, the reflective layer does not comprise more than two electrically conductive layers based on silver.

The outer pane has an outer-side surface facing away from the thermoplastic intermediate layer, which is also simultaneously the outer face of the laminated pane. The outer pane also has an interior-side surface facing the thermoplastic intermediate layer. The interior-side surface of the inner pane is at the same time the inner face of the laminated pane. The inner pane also has an outer-side surface facing the thermoplastic intermediate layer. The laminated pane is provided for separating an external environment from an interior, preferably a vehicle interior. The outer-side surface of the outer pane is provided here to face the external environment, and the interior-side surface of the inner pane is provided to face the interior.

The laminated pane has a peripheral edge, which particularly preferably comprises an upper edge and a lower edge and two side edges running between them with a left and a right side edge. Upper edge means the edge intended to point upward in the installed position. Lower edge means the edge intended to point downward in the installed position. The upper edge is often also referred to as the roof edge, and the lower edge is often also referred to as the engine edge.

As is usual in the case of HUDs and projection arrangements based on similar technology, the projector irradiates the display region, that is to say a projection area, of the laminated pane, in particular with a p-polarized radiation in the wavelength range from 380 nm to 780 nm. The p-polarized radiation is reflected in the display region in the direction of an observer, as a result of which a virtual image is generated which the observer perceives, when viewed from their perspective, behind the laminated pane (in the case of an HUD). The beam direction of the projector can typically be varied by mirrors, in particular vertically, in order to adapt the projection to the body size of the viewer. The area in which the observer's eyes must be located at a given mirror position is referred to as the eye box window. This eye box window can be displaced vertically by adjusting the mirrors, wherein the entire area accessible as a result (i.e., the superimposition of all possible eye-box windows) is referred to as the eye box. An observer located within the eye box can perceive the virtual image. This means, of course, that the observer's eyes must be located within the eye box, not, for instance, the entire body.

The p-polarized radiation is mainly reflected by the reflective layer, i.e., the reflection with the greatest intensity takes place at the reflective layer. A further portion of the p-polarized radiation is reflected at the reflection-increasing coating. The two portions of the reflected p-polarized radiation, once through the reflection-increasing coating and once through the reflective layer, are at least partially added together, whereby the total reflection (added portions of the p-polarized radiation for the reflective layer and the reflection-increasing coating) increases for the observer within the eye box. That is to say that the intensity of the p-polarized radiation reflected at the reflective layer and the reflection-increasing coating is higher than the intensity of the radiation reflected at each other interface, in particular higher than the intensities of the p-polarized radiation reflected on the interior-side surface of the inner pane and the outer-side surface of the outer pane.

The radiation of the projector is p-polarized at least with a proportion of more than 50%, wherein the proportion of the p-polarized radiation is preferably at least 80%. The radiation of the projector is particularly preferably completely, i.e. 100%, or almost completely p-polarized (substantially purely p-polarized).

The indication of the polarization direction refers to the plane of incidence of the radiation on the laminated pane. P-polarized radiation refers to a radiation the electric field of which oscillates in the plane of incidence. P-polarized radiation refers to a radiation the electric field of which oscillates perpendicular to the plane of incidence. The plane of incidence is spanned by the incident vector and the surface normal of the laminated pane in the geometric center of the irradiated region.

The projector is preferably a liquid-crystal display (LCD), thin-film transistor (TFT) display, light-emitting diode (LED) display, organic light-emitting diode (OLED) display, electroluminescent display (ELD), or micro-LED display.

The technical terms used here from the field of HUDs are generally known to the person skilled in the art. For a detailed depiction, reference is made to the dissertation "Simulation-based measurement technique for testing head-up displays" by Alexander Neumann at the Institute for Informatics of the Technical University of Munich (Munich: university library of TU Munich, 2012), in particular to Chapter 2 "The Head-Up Display."

Furthermore, the reflected image can also be seen by wearers of polarization-selective sunglasses, which typically allow only p-polarized radiation to pass through and block s-polarized radiation. In combination with the reflection-increasing coating, the reflective layer effects a high reflectance with respect to p-polarized radiation, in particular in the spectral range from 380 nm to 780 nm. A strong-intensity HUD image is thereby achieved. The first and the second electrically conductive layer based on silver and the reflection-increasing coating do not excessively decrease the light transmission, so that the laminated pane can be used as a windshield.

The outer pane and the inner pane are preferably produced from transparent glass, in particular of soda-lime glass, which is customary for window panes. In principle, however, the panes can also be produced from other types of glass (for example borosilicate glass, quartz glass, aluminosilicate glass) or transparent plastics (for example polymethyl methacrylate or polycarbonate). The thickness of the outer pane and the inner pane can vary widely. Preferably, panes having a thickness in the range from 0.8 mm to 5 mm, preferably from 1.4 mm to 2.5 mm, are used, for example those with the standard thicknesses of 1.6 mm or 2.1 mm. Independently of each other the outer pane and the inner panes can be not prestressed, partially prestressed or prestressed. If at least one of the panes should be prestressed, this can be thermal or chemical prestressing.

In a particularly preferred embodiment of the invention, the inner pane has a thickness of less than 1.6 mm, particularly preferably a thickness of less than or equal to 1.4 mm, and in particular a thickness of less than or equal to 1.1 mm. The reduction in the thickness of the inner pane is accompanied by an alignment of the double image to the primary image. This means that the undesired double image, which arises on the interior-side surface of the inner pane, approaches the primary image more closely (the images overlap to a greater extent, whereby the impression of a double image is reduced). The double image is thus almost or completely within the primary image and is not perceived to be disturbing or is perceived to be less disturbing than in the case of an inner pane having a greater thickness.

According to the invention, the reflection-increasing coating comprises at least one optically low-refractive layer having a refractive index of less than or equal to 1.6, and an optically high-refractive layer having a refractive index of greater than or equal to 1.9. The reflection-increasing coating is preferably formed only from these two layers and has no further layers below or above one of the two layers. An optically low-refractive layer and an optically high-refractive layer are sufficient to achieve the effect according to the invention. In principle, however, the reflection-increasing coating can also comprise further layers, which may be desired for optimizing certain parameters in individual cases. The high-refractive and the low-refractive layer preferably together comprise two or more layers having a different refractive index. The refractive index here is greater than or equal to 1.9 for each layer of the high-refractive layer, and is less than or equal to 1.6 for the low-refractive layer. The reflection-increasing coating is transparent with an average transmittance of visible light (380 nm to 780 nm) of preferably at least 80% and in particular at least 85%.

The reflection-increasing coating preferably extends over at least 30%, particularly preferably over at least 50%, very particularly preferably over at least 80%, and in particular over 100% of the interior-side surface of the inner pane.

The optically high-refractive layer is preferably arranged closer to the interior-side surface of the inner pane than the optically low refractive layer. The optically high-refractive coating is preferably applied here to the interior-side surface of the inner pane and/or to a coating or print (for example a cover layer) applied beforehand on the interior-side surface. The optically low-refractive layer is consequently applied to the optically high-refractive layer in this case.

The high-refractive layer has a refractive index of at least 1.9 and preferably at least 2.0. The increase in the refractive index results in a high-refractive effect. The high-refractive layer can also be referred to as a reflection-increasing layer, since it typically increases the overall reflection of the coated surface. The mentioned refractive indices lead to particularly good results. The refractive index is preferably at most 2.5—a further increase in the refractive index would not result in any further improvement as regards the p-polarized radiation, but would increase overall reflection.

In the context of the present invention, refractive indices are in all cases specified in relation to a wavelength of 550 nm. Methods for determining refractive indices are known to the person skilled in the art. The refractive indices specified within the scope of the invention can be determined, for example, by ellipsometry, wherein commercially available ellipsometers can be used. Unless otherwise indicated, the specification of layer thicknesses or thicknesses refers to the geometric thickness of a layer.

Suitable materials which may form the basis of the optically high-refractive layer are silicon nitride ($Si_3N_4$), a silicon-metal mixed nitride (for example, silicon zirconium nitride (SiZrN), silicon-aluminum mixed nitride, silicon-hafnium mixed nitride, or silicon-titanium mixed nitride), aluminum nitride, tin oxide, tungsten oxide, niobium oxide, bismuth oxide, titanium oxide, tin-zinc mixed oxide, indium tin oxide, and zirconium oxide. Furthermore, transition metal oxides (such as tantalum oxide) or lanthanide oxides (such as lanthanum oxide or cerium oxide) can also be used. Mixtures of these materials are also possible. The high-refractive layer can have a thickness of 20 nm to 150 nm, preferably a geometric thickness of 40 nm to 100 nm, and in particular a thickness of 40 nm to 70 nm. The high-refractive layer is designed in particular on the basis of silicon nitride, indium tin oxide or silicon-zirconium mixed nitride with a preferred geometric thickness of 20 nm to 150 nm. In these materials and in particular the layer thicknesses described, a high reflection-increasing effect has surprisingly been shown without the intensity of ghost images increasing.

In a preferred embodiment, the refractive index of the optically low-refractive layer is at most 1.5 and particularly preferably at most 1.4, for example 1.25 to 1.35. These values have proven to be particularly advantageous with regard to the reflection properties of the laminated pane.

If the reflection-increasing coating or only the low-refractive layer is applied by means of the sol-gel process on a substrate (for example the interior-side surface of the inner pane), the low-refractive layer is preferably formed on the basis of nanoporous silicon oxide. The reflection properties of the layer are determined, on the one hand, by the refractive index and, on the other hand, by the thickness of the low-refractive layer. The refractive index, in turn, depends on the pore size and the density of the pores. In a preferred embodiment, the pores are dimensioned and distributed such that the refractive index is from 1.2 to 1.4, particularly preferably from 1.25 to 1.35. A refractive index in these ranges is particularly advantageous to achieve a homogeneous reflection spectrum in the angle of incidence range around 65° and around 75°. The thickness of the low-refractive layer is preferably from 30 nm to 500 nm, particularly preferably from 50 nm to 150 nm. Good properties are thus achieved.

The silicon oxide can be doped, for example with aluminum, zirconium, titanium or boron. In particular the optical, mechanical and chemical properties of the coating can be adapted by dopants.

The low-refractive and/or the high-refractive layer preferably comprises only one homogeneous layer. However, it is also possible to form the low-refractive layer from a plurality of layers of nanoporous or largely non-porous material (for example layer by sputtering or chemical vapor deposition) or mixtures thereof, which differ, for example, in terms of porosity (size and/or density). A profile of refractive indices can thus be generated, so to speak.

The pores in a nanoporous material, preferably nanoporous silicon oxide, are in particular closed nanopores, but can also be open pores. Nanopores are understood to mean pores which have sizes in the nanometer range, i.e., from 1 nm to less than 1,000 nm (1 μm). The pores preferably have a substantially circular cross-section (spherical pores), but can also have other cross-sections, for example an elliptical, oval or elongated cross-section (ellipsoidal or ovoid pores). Preferably, at least 80% of all pores have substantially the same cross-sectional shape. It can be advantageous if the pore size is at least 20 nm or even at least 40 nm. The average size of the pores is preferably from 1 nm to 500 nm, particularly preferably from 1 nm to 100 nm, very particularly preferably from 20 nm to 80 nm. With circular pores, the size of the pore is understood to mean the diameter, and with pores of other shapes, the greatest linear expansion. Preferably, at least 80% of all pores have sizes in the specified ranges; particularly preferably, the sizes of all pores lie within the specified ranges. The proportion of pore volume in the total volume preferably lies between 10% and 90%, particularly preferably below 80%, and very particularly preferably below 60%.

If thin layers are mentioned, that is to say layers with a thickness of below 1000 nm, the following applies: if something is formed "on the basis" of a material, it consists predominantly of this material, in particular substantially from this material in addition to any impurities or doping. Unless otherwise indicated, the specification of layer thicknesses or thicknesses refers to the geometric thickness of a layer.

In principle, such a reflection-increasing coating can be by physical or chemical vapor deposition, i.e., a PVD or CVD coating (PVD: physical vapor deposition, CVD: chemical vapor deposition), or can be applied, for example, by means of the sol-gel process. Such coatings can be generated with particularly high visual quality and with particularly low thickness. In this production variant, the low-refractive layer and the high-refractive layer are applied consecutively, i.e. one after the other. The application of low-refractive or high-refractive layers by means of the sol-gel process is known to a person skilled in the art and can be found, for example, in WO2021209201A1.

A PVD coating can be a coating applied ("sputtered on") by cathode sputtering, in particular a coating applied by magnetic field-assisted cathode sputtering (magnetron sputtering). Preferably, the reflection-increasing coating is applied by magnetron sputtering.

If the reflection-increasing coating is applied by means of chemical vapor deposition, this is preferably done by means of plasma-enhanced chemical vapor deposition (PECVD); in particular, this production takes place at atmospheric pressure (APCVD). The advantage of plasma-enhanced chemical vapor deposition is the speed of application with simultaneously high homogeneity of the layers compared to many other methods. In particular silicon oxide can be applied homogeneously and efficiently to a substrate by means of this production.

The angle of incidence of the p-polarized radiation of the projector is the angle between the incident vector of the projector radiation and the interior-side surface normal (i.e., the surface normal to the interior-side external surface of the laminated pane). The angle of incidence of the p-polarized radiation onto the laminated pane is approximated with 65° in typical HUD arrangements or projection arrangements which are based on a similar technique. The geometric center of the display region, for example HUD region, is usually used to determine the angle of incidence. However, since it is not an individual point, but rather an area (namely the display region) that is irradiated, and in addition the projector radiation can be set within certain limits (via projection elements such as lenses and mirrors), so that the HUD image is perceivable by observers of different body size, a distribution of angles of incidence in the display region is provided in reality. This distribution of incidence angles must be used as a basis for the design of the projection arrangement. The angles of incidence that occur are typically from 50° to 75°, preferably from 62° to 68°. The values refer to the entire HUD region, so that at no point of the HUD region does there occur an angle of incidence outside the stated ranges. The p-polarized radiation of the projector preferably strikes the laminated pane at an angle of incidence from 50° to 75°.

The reflective layer is a thin-film stack, which thus comprises a layer sequence of thin individual layers. In accordance with the invention, this thin-film stack comprises at least a first dielectric layer or layer sequence, a first electrically conductive layer based on silver, a second dielectric layer or layer sequence, a second electrically conductive layer based on silver and a third dielectric layer or layer sequence. The first and the second electrically conductive layer based on silver give the reflective layer the basic reflective properties and also an IR-reflecting effect and electrical conductivity. The electrically conductive layers based on silver can also be referred to in simplified form as silver layers. It is a particular advantage of the present invention that the desired reflection properties can be achieved with two silver layers without the transmittance of visible light through the laminated pane being too greatly reduced, as would usually be the case when more than one electrically conductive layer is used. Even further electrically conductive layers can be present (but not based on silver), which do not substantially contribute to the electrical conductivity of the reflective layer, but fulfill another purpose. This applies in particular to metallic blocker layers having geometric thicknesses of less than 1 nm, which are preferably arranged between the first silver layer and the first dielectric layer or layer sequence and/or the first silver layer and the second dielectric layer or layer sequence and/or which are preferably arranged between the second silver layer and the second dielectric layer or layer sequence and/or the second silver layer and the third dielectric layer or layer sequence.

The first and/or the second electrically conductive layer preferably contain at least 90 wt % silver, particularly preferably at least 99 wt % silver, and very particularly preferably at least 99.9 wt % silver. The first and/or the second electrically conductive layer can comprise dopants, for example palladium, gold, copper or aluminum.

The geometric layer thickness of the individual silver layers is preferably at most 15 nm, particularly preferably at most 14 nm, very particularly preferably at most 13 nm. As a result, an advantageous reflectivity in the IR range can be achieved without reducing the transmission too much. The geometric layer thickness of the individual silver layers is preferably at least 6 nm, particularly preferably at least 7 nm. Thinner silver layers can lead to a de-wetting of the layer structure. Particularly preferably, the corresponding geometric layer thickness of the first and/or second electrically conductive layer is from 7 nm to 14 nm or from 8 nm to 13 nm.

In an advantageous embodiment of the invention, the first electrically conductive layer has a greater geometric thickness than the second electrically conductive layer; the first electrically conductive layer is preferably at least 15%, particularly preferably at least 25% thicker than the second electrically conductive layer. These differences in thickness result in an improved reflectance with a predominantly homogeneous reflection over the visible spectral range. It is also possible to use the reflective layer as a heating layer.

In an advantageous embodiment, the first and/or the second and/or the third dielectric layer or layer sequence does not comprise any materials of which the refractive index is less than 1.9. All dielectric layers or layer sequences of the reflective layer thus have a refractive index of at least 1.9. It is a particular advantage of the present invention that the desired reflection properties can be achieved solely with relatively high-refractive materials. Since, for low-refractive layers having a refractive index of less than 1.9, in particular silicon oxide layers can be considered, which have low deposition rates in the magnetic field-assisted cathode deposition, the reflective layer can thus be produced quickly and cost-effectively.

Common dielectric layers of the first, the second and/or the third dielectric layer or layer sequence are, for example:

anti-reflective layers which reduce the reflection of visible light and thus increase the transparency of the coated pane, for example based on silicon nitride, titanium oxide, aluminum nitride, tin zinc oxide, indium tin oxide, or tin oxide, with layer thicknesses of, for example, 10 nm to 100 nm;

refractive-index-increasing layers which have a higher refractive index than the anti-reflective layer, for example based on silicon metal mixed nitrides such as silicon zirconium mixed nitride, with layer thicknesses of, for example, 10 nm to 100 nm;

adjustment layers, which improve the crystallinity and thus the reflectance of the electrically conductive layer, for example based on zinc oxide (ZnO), with layer thicknesses of, for example, 3 nm to 20 nm.

The refractive-index-increasing layers are preferably arranged between anti-reflective layers and the first and/or second electrically conductive layer or between the adjustment layer (if present) and the anti-reflective layer.

Further materials of dielectric layers and layer sequences are generally known to a person skilled in the art and are known, for example, from WO2021104800A1.

Due to the first and the second electrically conductive layer, the reflective layer has reflective properties in the visible spectral range which occur with respect to p-polarized radiation. By suitably selecting the layer thicknesses, in particular the dielectric layer sequence, the reflection with respect to p-polarized radiation can be optimized in a targeted manner.

As already mentioned, in addition to the electrically conductive layers and dielectric layers or layer sequences, the reflective layer can also comprise blocker layers, which protect the first and the second electrically conductive layer from degeneration. Blocker layers are typically very thin metal-containing layers based on niobium, titanium, nickel, chromium, and/or alloys with layer thicknesses of, for example, 0.1 nm to 2 nm.

The geometric thickness of the first dielectric layer or layer sequence is preferably from 10 nm to 200 nm, particularly preferably from 20 nm to 100 nm. The geometric thickness of the second dielectric layer or layer sequence is preferably from 50 nm to 300 nm, particularly preferably from 70 nm to 200 nm. The geometric thickness of the third dielectric layer or layer sequence is preferably from 10 nm to 200 nm, particularly preferably from 20 nm to 100 nm. This achieves good results.

In a particularly preferred embodiment of the invention, the first dielectric layer sequence comprises, in this order, at least one silicon nitride layer (anti-reflective layer) and one zinc oxide layer (adjustment layer). The second dielectric layer sequence comprises at least one zinc oxide layer (adjustment layer), a silicon nitride layer (anti-reflective layer), a silicon mixed nitride layer (refractive-index-increasing layer), a further silicon nitride layer (anti-reflective layer), a further silicon mixed nitride layer (refractive-index-increasing layer), and a further zinc oxide layer (adjustment layer). The third dielectric layer sequence comprises at least one zinc oxide layer (adjustment layer) and a silicon nitride layer (anti-reflective layer).

The dielectric layers or layer sequences can also be constructed by other combinations of adjustment layers, anti-reflective layers, refractive-index-increasing layers. Various embodiments of the first, the second and the third dielectric layers or layer sequence are described below. Here, the blocker layers are optional additional layers that do not belong to the dielectric layers.

In a particularly preferred embodiment of the invention, the following layer sequence of the reflective layer is provided starting from the substrate (i.e., that surface onto which the dielectric layers and electrically conductive layers of the reflective layer are deposited):

anti-reflective layer-adjustment layer-blocker layer-first electrically conductive layer-blocker layer-adjustment layer-anti-reflective layer-refractive-index-increasing layer-anti-reflective layer-refractive-index-increasing layer-adjustment layer-blocker layer-second electrically conductive layer-blocker layer-adjustment layer-anti-reflective layer.

The geometric thickness of the anti-reflective layers is preferably from 10 nm to 40 nm in each case. The geometric thickness of the adjustment layer is preferably from 5 nm to 12 nm in each case. The geometric thickness of the blocker layer is preferably from 0.1 nm to 1 nm in each case. The geometric thickness of the refractive-index-increasing layers is preferably from 5 nm to 20 nm in each case. The geometric thickness of the first and the second electrically conductive layer is preferably from 6 nm to 15 nm in each case.

In a further preferred embodiment, the second dielectric layer has no refractive-index-increasing layer, and the following layer structure is provided, starting from the substrate:

anti-reflective layer-adjustment layer-blocker layer-first electrically conductive layer-blocker layer-adjustment layer-anti-reflective layer-anti-reflective layer-adjustment layer-blocker layer-second electrically conductive layer-blocker layer-adjustment layer-anti-reflective layer.

The geometric thickness of the anti-reflective layers is preferably from 5 nm to 60 nm in each case. The geometric thickness of the adjustment layer is preferably from 5 nm to 12 nm in each case. The geometric thickness of the blocker layer is preferably from 0.1 nm to 1 nm in each case. The geometric thickness of the first and the second electrically conductive layer is preferably from 6 nm to 15 nm in each case.

In addition, the following preferred layer sequences are provided for the reflective layer starting from the substrate:

anti-reflective layer-first electrically conductive layer-anti-reflective layer-second electrically conductive layer-anti-reflective layer.

anti-reflective layer-adjustment layer-first electrically conductive layer-adjustment layer-anti-reflective layer-anti-reflective layer-adjustment layer-second electrically conductive layer-adjustment layer-anti-reflective layer.

anti-reflective layer-first electrically conductive layer-anti-reflective layer-refractive-index-increasing layer-anti-reflective layer-refractive-index-increasing layer-second electrically conductive layer-adjustment layer-anti-reflective layer.

anti-reflective layer-adjustment layer-first electrically conductive layer-adjustment layer-anti-reflective layer-refractive-index-increasing layer-anti-reflective layer-refractive-index-increasing layer-adjustment layer-second electrically conductive layer-adjustment layer-anti-reflective layer.

anti-reflective layer-blocker layer-first electrically conductive layer-blocker layer-anti-reflective layer-refractive-index-increasing layer-anti-reflective layer-refractive-index-increasing layer-blocker layer-second electrically conductive layer-blocker layer-anti-reflective layer.

anti-reflective layer-blocker layer-first electrically conductive layer-blocker layer-anti-reflective layer-anti-reflective layer-blocker layer-second electrically conductive layer-blocker layer-anti-reflective layer.

The reflective layer can be applied on the interior-side surface of the outer pane or on the outer-side surface of the inner pane. Alternatively, the reflective layer can also be arranged within the thermoplastic intermediate layer, for example applied to a carrier film which is arranged between two thermoplastic laminated films. The reflective layer is preferably applied starting with the first dielectric layer or layer sequence on a substrate (i.e., for example, a film, the inner pane or the outer pane).

The arrangement of the reflective layer on the outer-side surface of the inner pane is particularly preferred because the projector radiation then only has to cover the shortest path possible through the laminated pane until it impinges on the reflective layer. This is advantageous with regard to the quality of the reflected image. The reflective layer is transparent, which in the context of the invention means that it has an average transmission in the visible spectral range of at least 70%, preferably at least 75%, and thereby does not significantly limit the view through the pane.

In principle, it is sufficient if the display region of the laminated pane is provided with the reflective layer. However, further regions can also be provided with the reflective layer and the laminated pane can be provided with the reflective layer substantially over the entire surface, which may be preferred due to the production process. In one embodiment of the invention, at least 80% of the pane surface is provided with the reflective layer according to the invention. In particular, the reflective layer is applied over the entire pane surface with the exception of a peripheral edge region and optionally local regions, which, in the installed position in a vehicle, are intended to ensure the transmission of electromagnetic radiation through the laminated pane as communication, sensor or camera windows, and therefore are not provided with the reflective layer. The peripheral uncoated edge region has, for example, a width of up to 20 cm. It prevents direct contact of the reflective coating with the surrounding atmosphere, so that the reflective layer in the interior of the laminated pane is protected against corrosion and damage. Due to the extent of the reflective layer over 80% or more of the area of the laminated pane, the possibilities result of using a plurality of projection arrangements, for example HUDs, which are operated independently of one another. In addition, by the extent over at least 80% of the area of the laminated pane, the reflective layer can also be used as an IR-reflecting coating or heating layer.

The reflective layer is preferably applied to a pane surface by physical vapor deposition (PVD), particularly preferably by cathode sputtering, very particularly preferably by magnetic field-assisted cathode sputtering ("magnetron sputtering"). The reflective layer is preferably applied before the lamination. Instead of applying the reflective layer to a pane surface, it can in principle also be provided on a carrier film which is arranged in the intermediate layer.

In the display region, the laminated pane provided with the reflective layer and the reflection-increasing coating preferably has, in the spectral range from 380 nm to 780 nm, particularly preferably from 380 nm to 680 nm, an average reflectance with respect to p-polarized radiation of at least 10%, particularly preferably of at least 12%. A projection image of sufficiently strong intensity is thus generated. In this case, the reflectance is measured with an angle of incidence of 65° with respect to the interior-side surface normal, which corresponds, for example, to irradiation by conventional projectors. The spectral range of 380 nm to 680 nm was used to characterize the reflection properties because the visual impression of an observer is primarily influenced by this spectral range. In addition, it covers the wavelengths relevant for the HUD representation (RGB: 473 nm, 550 nm, 630 nm). The high reflectance in a comparatively simple layer structure is a major advantage of the present invention. Particularly good results are achieved if the reflectance in the entire spectral range from 380 nm to 680 nm is at least 12%, so that the reflectance in the indicated spectral range is at no point below the stated values.

The reflectance describes the proportion of the total irradiated radiation that is reflected. It is indicated in % (based upon 100%-emitted radiation) or as a unitless number from 0 to 1 (normalized to the emitted radiation). It forms the reflection spectrum when plotted as a function of the wavelength. In the context of the present invention, the statements regarding reflectance relative to p-polarized radiation refer to the reflectance measured with an angle of incidence of 65° to the interior-side surface normal. The information on the reflectance or the reflection spectrum relates to a reflection measurement with a light source which radiates uniformly in the observed spectral range with a standardized radiation intensity of 100%.

The above-mentioned desired reflection characteristics are achieved in particular by the choice of materials and thicknesses of the first and the second electrically conductive layer and also the structure of the first, the second and the third dielectric layer or layer sequences. The reflective layer can thus be suitably adjusted.

Preferably, the display region is arranged within the look-through region of the laminated pane, i.e. a region of the pane which is intended to be looked through when the laminated pane is used as a vehicle pane. In this case, the display region is located in a region of the laminated pane, which region is intended to be used as a projection surface for an HUD. The projection arrangement according to the invention is thus preferably an HUD or a component of an HUD. The expression "arranged completely within the look-through region" means that the orthonormal projection of the display region relative to the plane of the look-through region is arranged completely within the cover region.

The laminated pane can have a cover layer, in particular formed from a dark, preferably black, enamel, which is preferably arranged in a frame-like manner along the peripheral edge region of the laminated pane. The cover layer is preferably applied to the interior-side surface of the outer pane, but it can also be applied to the interior-side surface of the inner pane or the outer-side surface of the inner pane. The cover layer serves primarily as UV protection for the structural adhesive of the laminated pane (for example, for gluing into a vehicle). The cover layer is opaque. The cover layer can also be designed to be semi-transparent, at least in sections—for example, as a dot matrix, stripe matrix, or checkered matrix. Alternatively, the cover layer can also have a gradient—for example, from an opaque coverage to a semi-transparent coverage. If the cover layer is applied to the interior-side surface of the inner pane, the reflection-increasing coating is preferably applied to the cover layer, in the regions of the inner pane which are covered with the cover layer, and is applied to the interior-side surface of the inner pane, in the regions of the interior-side surface to which no cover layer is applied.

The laminated pane can also have several cover layers, wherein preferably a first cover layer is applied to the interior-side surface of the outer pane and a second cover layer is applied to the interior-side surface of the inner pane.

In the sense of the present invention, "transparent" means that the total transmittance of the laminated pane corresponds to the legal provisions for windshields and preferably has a permeability (according to ISO 9050:2003) of more than 70%, in particular more than 75%, for visible light. Accordingly, "opaque" means a light transmittance of less than 15%, preferably less than 10%, particularly preferably less than 5%, and in particular less than 0.1%.

In a particularly preferred embodiment, the opaque cover layer is applied in at least one cover region of the laminated pane on the outer-side surface or on the interior-side surface of the outer pane. The opaque cover layer is preferably applied to the interior-side surface of the outer pane. The cover layer in this case preferably surrounds the laminated pane in a frame-like manner along the edge region of the laminated pane.

In a further preferred embodiment of the invention, the thermoplastic intermediate layer is opaque in at least the cover region of the laminated pane. The thermoplastic intermediate layer is preferably colored black in the portion of the cover region. Alternatively, the thermoplastic intermediate layer can also be formed by a first and a second thermoplastic laminated film, wherein the first thermoplastic laminated film is transparent and extends over the entire surface of the laminated pane with the exception of the cover region. The second thermoplastic laminated film is opaque and, for example, black, and extends at least, preferably exclusively, over the cover region of the laminated pane.

In a further preferred embodiment of the invention, an opaque, preferably black, film is arranged within the thermoplastic intermediate layer. The film extends at least over the cover region and preferably only over the cover region. The film is formed, for example, on the basis of polyethylene terephthalate. In the event that an opaque film is arranged within the thermoplastic intermediate layer, the reflective layer is either applied on the outer-side surface of the inner pane or on the opaque film, preferably on the surface of the film facing the inner pane.

The cover region is preferably a strip-like region which is arranged along the lower edge. The cover region thus extends from the left side edge to the right side edge and along the lower edge of the laminated pane. However, the cover region can also extend in a strip-like manner along the upper edge from the left-hand to the right-hand side edge and/or along the left-hand and/or the right-hand side edge from the lower edge to the upper edge. The cover region particularly preferably borders directly on the upper, side, and/or lower edge. The cover region can also run circumferentially along the edge region of the laminated pane in a frame-like manner. The cover region is not arranged within the region of the laminated pane, which region is provided as a look-through region, for example in the course of use as a windshield in a vehicle. The width of the cover region is preferably 20 cm to 50 cm. "Width" within the meaning of the invention means the extent perpendicular to the extension direction.

In a very particularly preferred embodiment of the invention, the cover layer extends in at least the cover region of the laminated pane. The cover layer is applied here on the outer-side surface or on the interior-side surface of the outer pane. Alternatively, the thermoplastic intermediate layer is opaque in at least the portion located within the cover region or is designed as at least two laminated films, wherein one laminated film of the two laminated films is colored black and extends at least over the entire cover region. In this alternative (i.e., the colored thermoplastic intermediate layer), the reflective layer is applied to the outer-side surface of the inner pane. When looking through the laminated pane (with viewing direction from the inner pane to the outer pane), the display region overlaps at least partially with the cover region and is in particular arranged completely within the cover region. The expression "arranged completely within the cover region" means that the orthonormal projection of the display region relative to the plane of the cover region is arranged completely within the cover region. The at least partial overlapping of the display region with the cover region results in a good image representation with high contrast with respect to the opaque cover region, so that it appears bright and thus can also be identified incredibly clearly. This advantageously enables a reduction in the power of the projector. This leads to reduced energy consumption and reduced heat generation. Since the cover region is arranged outside the look-through region of a windshield, the use of this embodiment in a vehicle is also suitable, for example, as a replacement for a display, which is usually installed in a dashboard.

The thermoplastic intermediate layer is preferably formed as at least one thermoplastic laminated film and is based on ethylene vinyl acetate (EVA), polyvinyl butyral (PVB), or polyurethane (PU) or mixtures or copolymers or derivatives thereof, particularly preferably based on polyvinyl butyral (PVB) and, in addition, additives known to a person skilled in the art, for example plasticizers. The thermoplastic film preferably contains at least one plasticizer.

The thermoplastic intermediate layer may be formed by a single film or also by more than one film. The thermoplastic intermediate layer can be formed by one or more thermoplastic films arranged one above the other, wherein the thickness of the thermoplastic intermediate layer after the lamination of the layer stack is preferably from 0.25 mm to 1 mm, typically 0.38 mm or 0.76 mm. The thermoplastic intermediate layer can also be formed from a film which is dyed in regions and thus opaque. The intermediate layer can also be formed from more than one film, wherein the at least two films extend over different regions of the area of the laminated pane.

The thermoplastic intermediate layer can also be a functional thermoplastic film, in particular a film with acoustically damping properties, a film reflecting infrared radiation, a film absorbing infrared radiation, and/or a film absorbing UV radiation. For example, the thermoplastic intermediate layer can also be a bandpass filter film.

The outer pane, the inner pane, and the laminated pane can have any three-dimensional shape. Preferably, the inner pane and the outer pane do not have any shadow zones, so that they can be coated efficiently by cathode sputtering. The inner pane and the outer pane and thus also the laminated pane are preferably flat or slightly or strongly curved in one direction or in several spatial directions.

If something is formed "based on" a polymeric material, it consists predominantly, that is to say at least 50%, preferably at least 60%, and in particular at least 70%, of this material. It can thus also contain further materials such as, for example, stabilizers or plasticizers.

Furthermore, the invention also extends to a method for producing a projection arrangement according to the invention. The method comprises:

(a) arranging an outer pane, a thermoplastic intermediate layer, a reflective layer, an inner pane and a reflection-increasing coating to form a layer stack, wherein the thermoplastic intermediate layer is arranged between the outer pane and the inner pane, and the reflective layer is arranged in a display region of the layer stack and between the outer pane and the inner pane, and the reflection-increasing coating is arranged at least within the display region (D), which is arranged on the interior-side surface of the inner pane facing away from the thermoplastic intermediate layer, wherein the reflection-increasing coating comprises at least one optically high-refractive layer having a refractive index of greater than or equal to 1.9 and at least one optically low-refractive layer having a refractive index of less than or equal to 1.6, and the reflective layer, in this order, comprises a first dielectric layer or layer sequence, a first electrically conductive layer based on silver, a second dielectric layer, or layer sequence, a second electrically conductive layer based on silver and a third dielectric layer or layer sequence, wherein the reflective layer does not comprise more than two electrically conductive layers based on silver.

(b) the lamination of the layer stack to form a laminated pane, wherein the display region of the laminated pane (1) also results from the display region of the layer stack, (c) arranging a projector, the radiation of which is predominantly p-polarized, and which is directed toward the display region, wherein the projector is arranged such that the interior-side surface of the inner pane is the face of the laminated pane closest to the projector, wherein the reflective layer is suitable for reflecting the p-polarized radiation of the projector to at least 5%.

The invention also comprises the use of a projection arrangement according to the invention, wherein the projector is directed toward the display region and the predominantly p-polarized radiation of the projector is reflected by the reflective layer and the reflection-increasing coating, which are located within the display region. The preferred embodiments described above apply accordingly to use.

The invention further extends to the use of the projection arrangement according to the invention in vehicles for traffic on land, in the air or on water, in particular in motor vehicles. The use of the laminated pane as a vehicle windshield is preferred.

The various embodiments of the invention may be implemented individually or in any combinations. In particular, the features mentioned above and to be explained below can be used not only in the specified combinations but also in other combinations or alone without departing from the scope of the present invention.

In the following, the invention is explained in more detail with the aid of a drawing and examples of embodiments. The drawing is a schematic representation and is not true to scale. The drawing does not limit the invention in any way.

Figure 2:
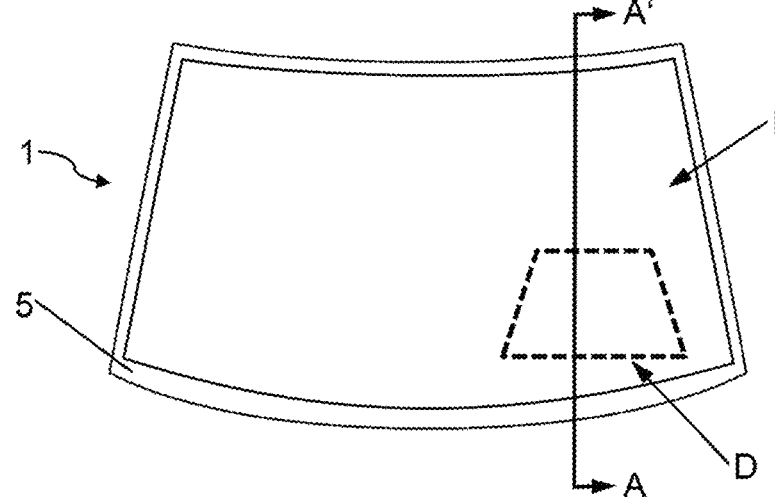
Figure 3:
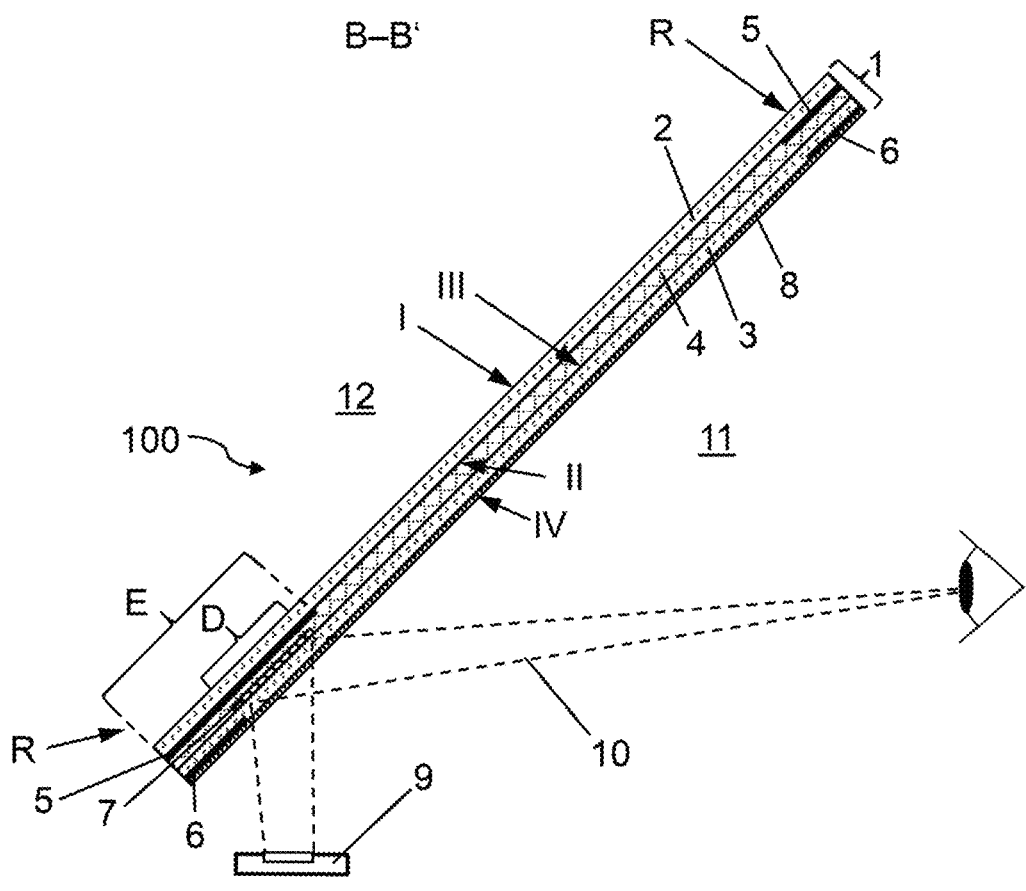
Figure 4:
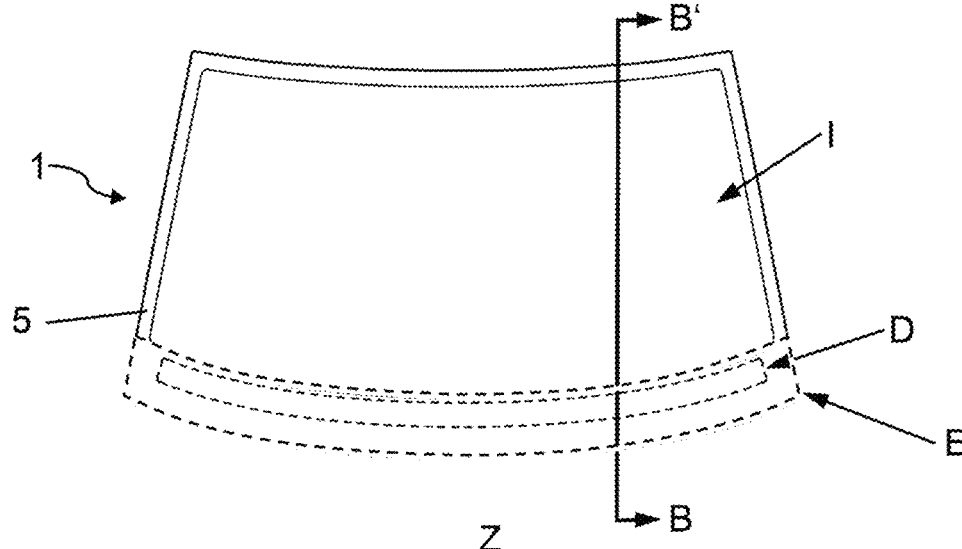
Figure 5:
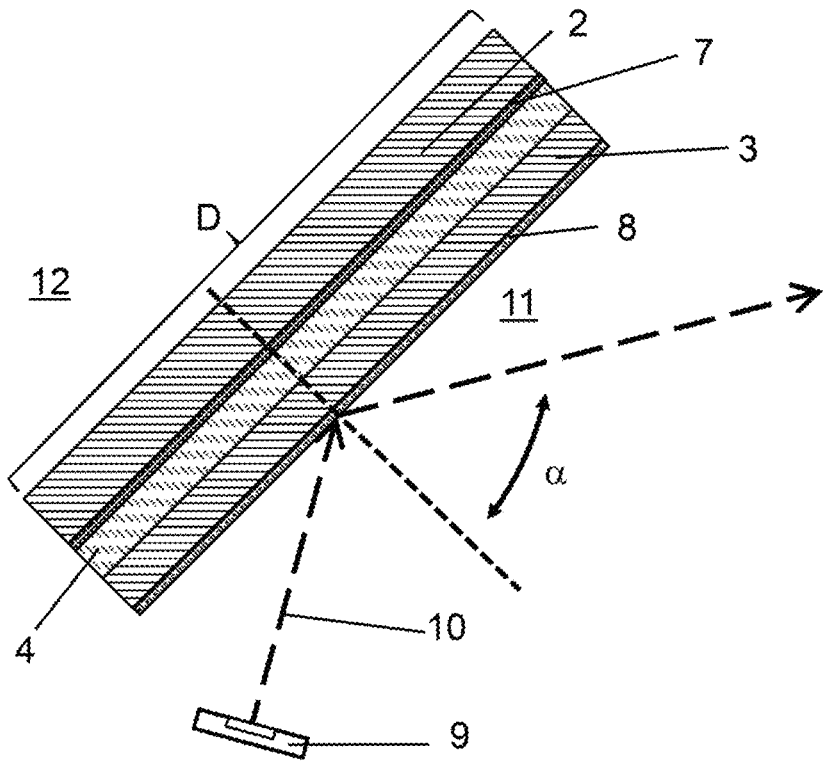
Figure 6:
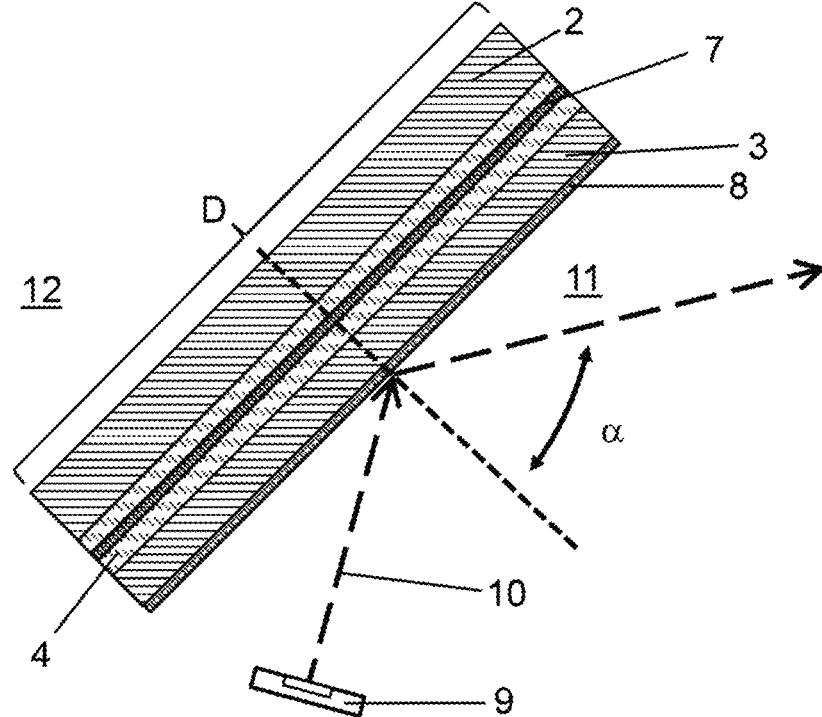
Figure 7:
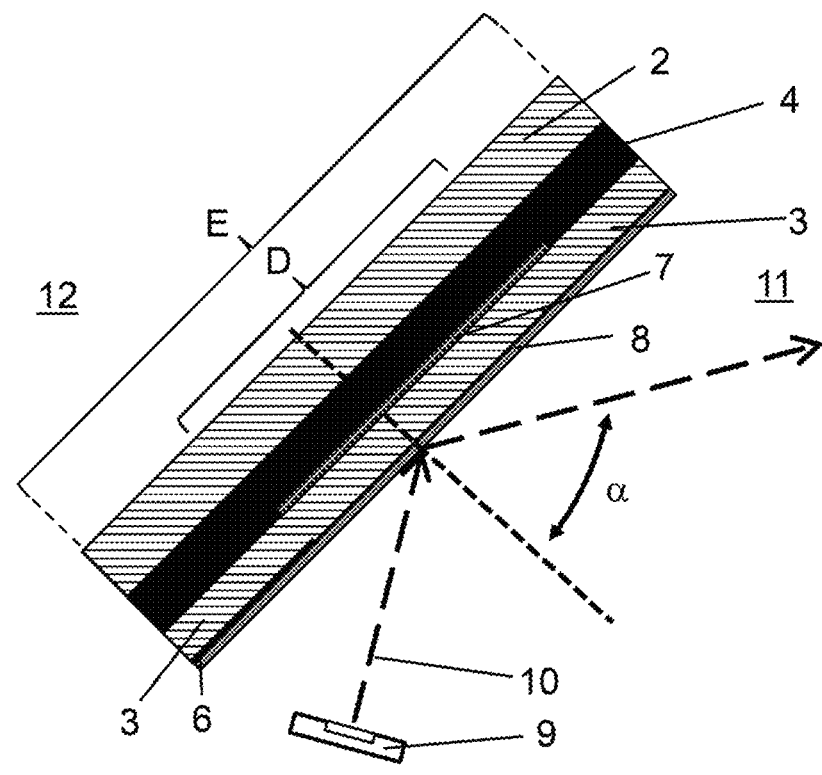
Figure 8:
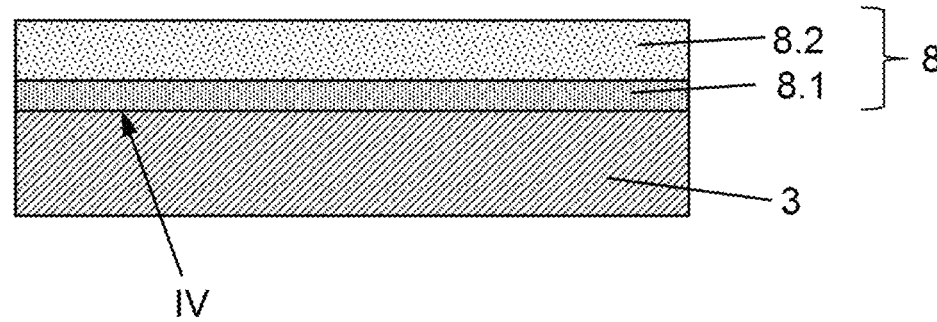
Figure 9:
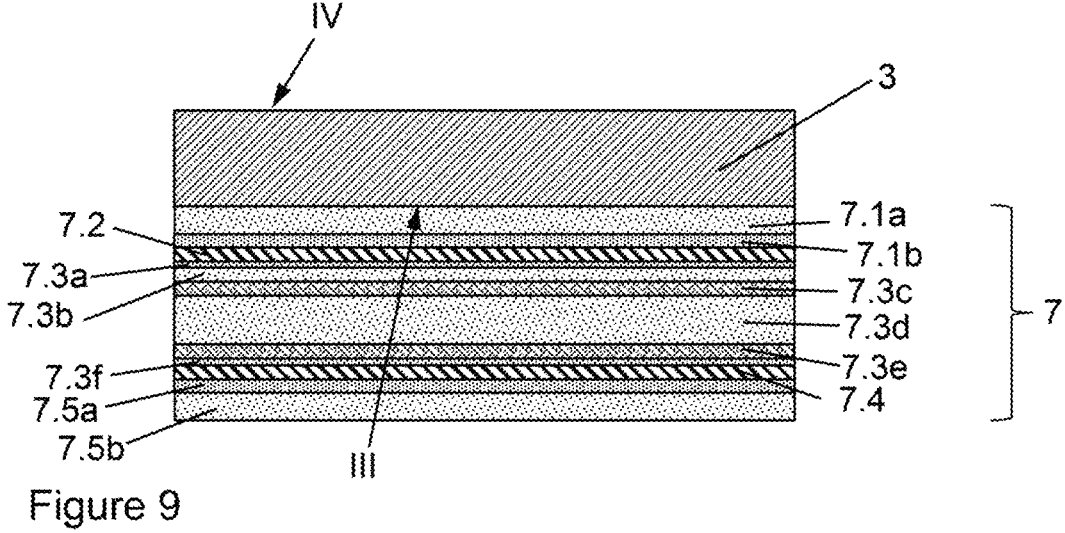
Figure 10:
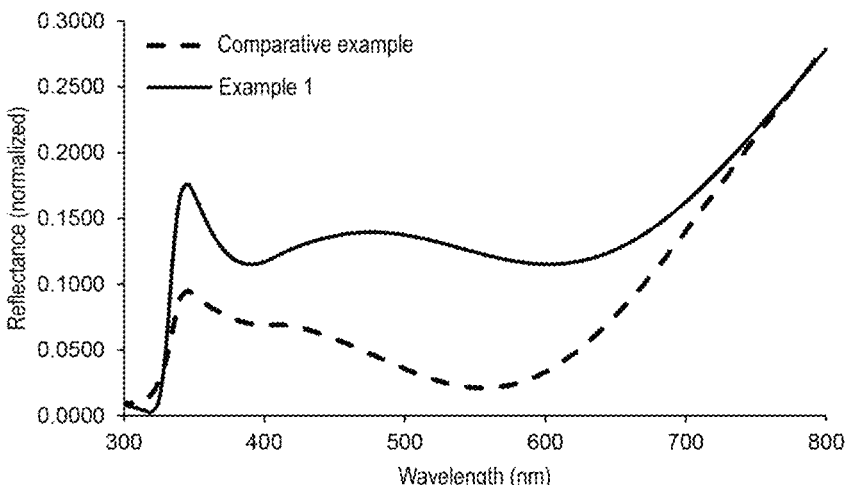
Figure 11:
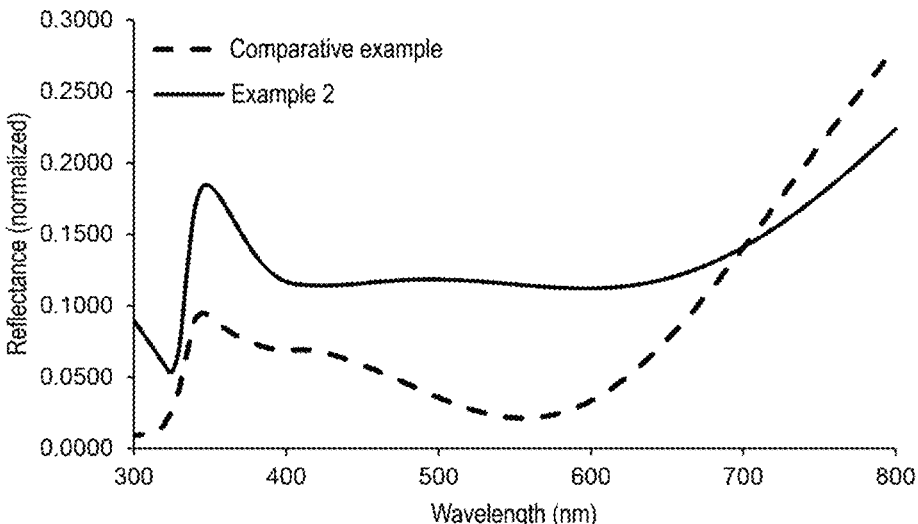
Figure 12:
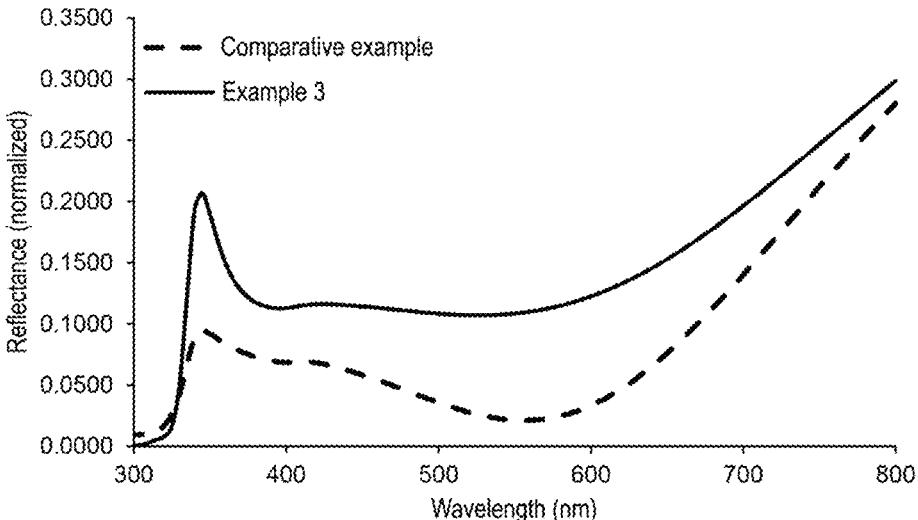

In the figures:

FIG. 1 shows a cross-sectional view of a preferred embodiment of the projection arrangement according to the invention, FIG. 2 shows a plan view of the laminated pane of FIG. 1, FIG. 3 shows a cross-sectional view of a further preferred embodiment of the projection arrangement according to the invention, FIG. 4 shows a plan view of the laminated pane from FIG. 3, FIGS. 5-6 show different embodiments of the projection arrangement according to the invention in section D along section line A-A' according to FIG. 2, FIG. 7 shows different embodiments of the projection arrangement according to the invention in section E along section line B-B' according to FIG. 4, FIG. 8 shows a cross section through an embodiment of the reflection-increasing coating on an inner pane, FIG. 9 shows a cross section through an embodiment of the reflective layer on an inner pane, and FIGS. 10-12 show reflection spectra of laminated panes compared to p-polarized radiation according to examples 1 to 3, in each case shown with a comparative example.

FIG. 1 shows a cross-sectional view of an exemplary embodiment of the projection arrangement 100 according to the invention in the installed state in a vehicle in a highly simplified, schematic representation. A plan view of the laminated pane 1 of the projection arrangement 100 from FIG. 1 is shown in FIG. 2. The cross-sectional view of FIG. 1 corresponds to the section line A-A' of the laminated pane 1, as indicated in FIG. 2.

The laminated pane 1 comprises an outer pane 2 and an inner pane 3 with a thermoplastic intermediate layer 4, which is arranged between the outer pane 2 and the inner pane 3. The laminated pane 1 is installed in a vehicle and separates an interior 11 from an external environment 12. The laminated pane 1 is, for example, the windshield of a motor vehicle.

The outer pane 2 and the inner pane 3 each consist of glass, preferably thermally pre-stressed soda-lime glass, and are transparent to visible light. The inner pane 3 has, for example, a thickness of 1.1 mm and is thus significantly thinner than usually used inner panes in windshields. The outer pane 2 has, for example, a thickness of 2.1 mm. The thermoplastic intermediate layer 4 comprises a thermoplastic, preferably polyvinyl butyral (PVB), ethylene vinyl acetate (EVA), and/or polyethylene terephthalate (PET).

The outer-side surface I of the outer pane 2 faces away from the thermoplastic intermediate layer 4 and is, at the same time, the outer face of the laminated pane 1. The interior-side surface II of the outer pane 2 and the outer-side surface III of the inner pane 3 each face the intermediate layer 4. The interior-side surface IV of the inner pane 3 faces away from the thermoplastic intermediate layer 4 and is, at the same time, the inner side of the laminated pane 1. It is understood that the laminated pane 1 can have any suitable geometric shape and/or curvature. As a windshield, it typically has a convex curvature.

A frame-like circumferential first cover layer 5 is located on the interior-side surface II of the outer pane 2 in a circumferential edge portion R of the laminated pane 1. The first cover layer 5 is opaque and prevents the view to structures arranged on the inner side of the laminated pane 1. Furthermore, in the edge portion R on the interior-side surface IV of the inner pane 3, the laminated pane 1 also has a second opaque cover layer 6, which is formed circumferentially like a frame. The first and second opaque cover layer 5, 6 consist of an electrically non-conductive material conventionally used for cover prints, for example of a black-colored screen-printing ink which is burnt in. The first and the second opaque cover layer 5, 6 prevent the view through the laminated pane 1, as a result of which, for example, an adhesive strand for adhesively bonding the laminated pane 1 into a vehicle body is not visible from the external environment 12.

A reflection-increasing coating 8 is applied on the interior-side surface IV of the inner pane 3 and on the second cover print 6. The reflection-increasing coating 8 extends over the entire interior-side surface IV of the inner pane 3. The reflection-increasing coating 8 comprises at least one optically high-refractive coating 8.1 having a refractive index greater than or equal to 1.9, for example silicon nitride, and an optically low-refractive coating 8.2 having a refractive index less than or equal to 1.6, for example silicon oxide.

A reflective layer 7 is applied to the outer-side surface III of the inner pane 3. The reflective layer 7 extends over the entire outer-side surface III of the inner pane 3. The reflective layer 7 is arranged, when looking through the laminated pane 1 (with a viewing direction starting from the interior 11), in complete overlap or congruently with the reflection-increasing coating 8.

The reflective layer 7 is a layer stack which, in this order, comprises at least one first dielectric layer or layer sequence 7.1, a first electrically conductive layer 7.2 based on silver, a second dielectric layer or layer sequence 7.3, a second electrically conductive layer 7.4 based on silver and a third dielectric layer or layer sequence 7.5, wherein details of the structure of such a layer stack are shown in FIG. 9.

The projection arrangement 100 has a projector 9 as image generator. The projector 9 is used to generate p-polarized radiation 10 (image information), which is directed onto a display region D and is reflected by the reflective layer 7 as reflected light into the vehicle interior 11, where it can be perceived by a viewer, in this example the driver. The display region D is the region of the laminated pane 1, which region is usually used as a head-up display (HUD). The reflective layer 7 is suitably designed to reflect the p-polarized radiation 10 of the projector 9, i.e., an image formed by the p-polarized radiation 10 of the projector 9. The p-polarized radiation 10 preferably impinges on the laminated pane 1 at an angle of incidence from 50° to 80°, in particular from 65° to 75°. The projector 9 is, for example, a display, in the present case an LCD display. It would also be possible, for example, for the laminated pane 1 to be a roof panel, side pane, or rear pane. The p-polarized radiation 10 is constituted by light waves within the wavelength range from 380 nm to 780 nm visually perceptible to humans.

Due to the reflection-increasing coating 8, which is arranged upstream of the reflective layer 7 (i.e., closer to the interior than the reflective layer 7), the relative radiation intensity of the secondary images, so-called ghost images, can be reduced compared to the intensity of the total reflection, whereas the intensity of the total reflection of the p-polarized radiation 10 is increased. The use of a particularly thin inner pane 3 in comparison with usually used inner panes with thicknesses of 1.6 mm or greater likewise reduces the creation of ghost images which usually occur on the interior-side surface IV of the inner pane 3. The reflective layer 7 with two electrically conductive layers 7.2, 7.4 also has an improved reflection characteristic as compared to generic laminated panes with head-up displays and is additionally suitable, for example, as an electrically heatable layer or IR- (infrared radiation-)reflecting layer for reducing the transmission of heat radiation through the laminated pane 1.

The variant shown in FIGS. 3 and 4 corresponds substantially to the variant from FIG. 1 and FIG. 2, and therefore only the differences will be discussed here, and reference is otherwise made to the description relating to FIG. 1 and FIG. 2.

The first cover layer 5 is widened along an edge portion of the laminated pane 1, the cover region E, wherein the cover region E directly adjoins the motor edge in the installed state of the pane as a windshield in a motor vehicle.

In contrast to FIGS. 1 and 2, the reflective layer 7 does not extend over the entire outer-side surface III of the inner pane 3, but only over the display region D. The display region D is arranged within the cover region E in the exemplary embodiment shown. The reflective layer 7 is thus completely covered by the first cover layer 5 in the cover region E in a view through the laminated pane 1, in a viewing direction from the external environment 12 into the interior 11. In a view through the laminated pane 1 starting from the interior 11, the reflective layer 7 is thus arranged in front of the first cover layer 5.

Due to the arrangement of the reflective layer 7 in front of the opaque first cover layer 5, a good image representation with high contrast results. The reflective layer 7 appears bright and the reflected image (p-polarized radiation 10) is thus also visible incredibly clearly. This advantageously enables a reduction in the power of the projector 9 and thus a reduced energy consumption and heat generation.

Reference is now made to FIGS. 5 and 6, in which enlarged cross-sectional views of various embodiments of the laminated pane 1 are shown. The cross-sectional views of FIGS. 5 and 6 correspond to section line A-A' in the lower display region D of the laminated pane 1, as indicated in FIG. 2.

The embodiment of the laminated pane 1 shown in FIG. 5 corresponds substantially to the laminated pane 1 according to the embodiment of FIG. 1. However, in this embodiment, the reflective layer 7 is not applied on the outer-side surface III of the inner pane 3, but on the interior-side surface II of the outer pane 2.

The angle αδ shown in FIG. 5 shows the angle of incidence with which the p-polarized radiation 10 impinges on the laminated pane 1. The p-polarized radiation 10 preferably impinges on the laminated pane 1 at an angle of incidence from 50° to 80°, in particular from 65° to 75°.

The embodiment of the laminated pane 1 shown in FIG. 6 corresponds substantially to the laminated pane 1 according to the embodiment of FIG. 1. However, the reflective layer 7 in this embodiment is designed as a coated film, wherein the first dielectric layer or layer sequence 7.1, the first electrically conductive layer 7.2 based on silver, the second dielectric layer or layer sequence 7.3, the second electrically conductive layer 7.4 based on silver and the third dielectric layer or layer sequence 7.5 are applied on a carrier film (layer sequence of the reflective layer 7 in FIG. 9). The carrier film is constructed, for example, on the basis of polyethylene terephthalate (PET) and has a thickness of 100 μm. In this exemplary embodiment, the reflective layer 7 is arranged within the thermoplastic intermediate layer 4. For this purpose, the reflective layer 7 is pressed into the thermoplastic intermediate layer 4 by means of pressure, for example (for example during the lamination of the pane).

The surface of the carrier film coated with the electrically conductive layers 7.2, 7.4, and dielectric layers 7.1, 7.3, 7.5 faces, for example, the outer-side surface III of the inner pane 3.

Reference is now made to FIG. 7, in which an enlarged cross-sectional view of a further embodiment of the laminated pane 1 is shown. The cross-sectional view of FIG. 7 corresponds to section line B-B' in the lower cover region E of the laminated pane 1, as indicated in FIG. 4.

The embodiment of the laminated pane 1 shown in FIG. 7 corresponds substantially to the laminated pane 1 according to the embodiment of FIG. 3. However, in this embodiment, no first cover layer 5 is applied to the interior-side surface II of the outer pane 2 in the cover region E. In this embodiment, the thermoplastic intermediate layer 4 is colored black within the cover region E. This means that the thermoplastic intermediate layer 4 is colored black in regions and thus opaque. The colored region of the thermoplastic intermediate layer 4 is limited to the cover region E, so that the intermediate layer 4 is transparent in the other regions of the laminated pane 1 (not shown here).

Alternatively, the thermoplastic intermediate layer 4 can also be formed by a first and a second thermoplastic laminated film, wherein the first thermoplastic laminated film is transparent and extends over the entire surface of the laminated pane 1 with the exception of the cover region E. The second thermoplastic laminated film is opaque and, for example, black and extends exclusively over the cover region E of the laminated pane 1.

The reflective layer 7 is completely covered by the thermoplastic intermediate layer 4 in a view through the laminated pane 1 starting from the external environment 12. If the interior 11 is viewed through the laminated pane 1, the reflective layer 7 is thus arranged in front of the colored region of the thermoplastic intermediate layer 4. As a result, when the reflective layer 7 is irradiated with p-polarized light 10 of the projector 9, a particularly high-contrast and visually clearly perceptible projector image is produced.

FIG. 8 shows the layer sequence of an embodiment of the reflection-increasing coating 8, which is applied to an inner pane 3. The reflection-increasing coating 8 is a stack of two thin layers. The reflection-increasing coating 8 comprises an optically high-refractive layer 8.1 and an optically low-refractive layer 8.2. The optically high-refractive layer 8.1 and the optically low-refractive layer 8.2 are arranged congruently one above the other, wherein the optically high-refractive coating 8.1 is applied on the interior-side surface IV of the inner pane 3 and the low-refractive layer 8.2 on the high-refractive layer 8.1.

The reflection-increasing coating 8 with the individual layers is preferably applied by magnetron sputtering.

FIG. 9 shows the layer sequence of an embodiment of the reflective layer 7, which is applied to an inner pane 3. The reflective layer 7 comprises, in this order, a first dielectric layer sequence 7.1, a first electrically conductive layer 7.2 based on silver, a second dielectric layer sequence 7.3, a second electrically conductive layer 7.4 based on silver, and a third dielectric layer sequence 7.5.

The first dielectric layer sequence 7.1 consists, for example, of a first anti-reflective layer 7.1a, which is applied to the outer-side surface III of the inner pane 3, and of a first adjustment layer 7.1b applied to the first anti-reflective layer 7.1a. The first electrically conductive layer 7.2 is arranged on the first adjustment layer 7.1b, wherein a 0.1 nm thick blocker layer, for example made of a nickel-chromium alloy, is arranged between the first electrically conductive layer 7.2 and the first adjustment layer 7.1b (blocker layer not shown here). The second dielectric layer sequence 7.3 consists of, in this order, a second adjustment layer 7.3a, a second anti-reflective layer 7.3b, a first refractive-index-increasing layer 7.3c, a third anti-reflective layer 7.3d, a second refractive-index-increasing layer 7.3e, and a third adjustment layer 7.3f. The second adjustment layer 7.3a is arranged here on the first electrically conductive layer 7.2, wherein a further 0.1 nm thick blocker layer, for example made of a nickel-chromium alloy, is arranged between the two layers 7.3a, 7.2 (blocker layer not shown here). The second electrically conductive layer 7.4 is arranged on the third adjustment layer 7.3f, wherein a 0.1 nm thick blocker layer, for example made of a nickel-chromium alloy, is arranged between the second electrically conductive layer 7.4 and the third adjustment layer 7.3f (blocker layer not shown here). The third dielectric layer sequence 7.3 consists, for example, of a fourth adjustment layer 7.5a and a fourth anti-reflective layer 7.5b. The fourth adjustment layer 7.5a is arranged here on the second electrically conductive layer 7.4, wherein a further 0.1 nm thick blocker layer, for example made of a nickel-chromium alloy, is arranged between the two layers 7.5a, 7.4 (blocker layer not shown here).

The layer structure shown in FIGS. 8 and 9 is to be understood merely by way of example. Thus, the reflection-increasing coating 8 can also comprise more layers as long as at least one is an optically low-refractive layer 8.2 and one is an optically high-refractive layer 8.1. The reflective layer 7 can have more or fewer layers than shown in FIG. 9, as long as at least one first dielectric layer or layer sequence 7.1, a first electrically conductive layer 7.2 based on silver, a second dielectric layer or layer sequence 7.3, a second electrically conductive layer 7.4, and a third dielectric layer or layer sequence 7.5 are contained, in this order.

Both for the reflection-increasing coating 8 and for the reflective layer 7, it is true that the layer sequences need not be symmetrical. Exemplary materials and layer thicknesses can be found in the following examples.

The layer sequences of a laminated pane 1 with the reflective layer 7 on the outer-side surface III of the inner pane 3 and the reflection-increasing coating 8 on the interior-side surface IV of the inner pane 3 according to examples 1 to 4 according to the invention are presented in Table 1 together with the materials and geometric layer thicknesses of the individual layers. In addition, a comparative example of a laminated pane of the generic type which does not satisfy the features according to the invention is shown in Table 1. The dielectric layers can be doped independently of one another, for example with boron or aluminum.

The examples and the comparative example differ primarily by the presence of a reflection-increasing coating 8 which is arranged on the interior-side surface IV of the inner pane 3. Due to this reflection-increasing coating 8, it is possible to achieve a high reflection of p-polarized light 10 without having a first and a second refractive-index-increasing layer 7.3c, 7.3e in the third dielectric layer sequence 7.3.

TABLE 1

| Material | Reference signs | | Example 1 | Example 2 | Example 3* | Example 4 | Comparative example |
|---|---|---|---|---|---|---|---|
| | | | Layer thickness | | | | |
| SiO$_2$ | 8 | 8.2 | 120 nm | 125 nm | 150 nm | 110 nm | — |
| Si$_3$N$_4$ | | 8.1 | 60 nm | 65 nm | 40 nm | 60 nm | — |
| Soda-lime glass | | 3 | 1.6 mm | 1.6 mm | 1.6 mm | 1.6 mm | 2.1 mm |
| Si$_3$N$_4$ | 7 | 7.1a | 20 nm | 25 nm | 30 nm | 40 nm | 9 nm |
| ZnO | | 7.1b | 10 nm | 10 nm | 10 nm | 10 nm | 10 nm |
| NiCr | | — | 0.1 nm | 0.1 nm | 0.1 nm | 0.1 nm | 0.1 nm |
| Ag | | 7.2 | 10.5 nm | 10.5 nm | 9 nm | 10 nm | 7.9 nm |
| NiCr | | — | 0.1 nm | 0.1 nm | 0.1 nm | 0.1 nm | 0.1 nm |
| ZnO | | 7.3a | 5 nm | 5 nm | 5 nm | 5 nm | 5 nm |
| Si$_3$N$_4$ | | 7.3b | 10 nm | 10 nm | 10 nm | 10 nm | 10 nm |
| SiZr$_{17}$N$_x$ | | 7.3c | 9 nm | 9 nm | 9 nm | — | 9 nm |
| Si$_3$N$_4$ | | 7.3d | 35 nm | 40 nm | 40 nm | 45 nm | 30 nm |
| SiZr$_{17}$N$_x$ | | 7.3e | 9 nm | 9 nm | 9 nm | — | 9 nm |
| ZnO | | 7.3f | 6 nm | 6 nm | 6 nm | 6 nm | 6 nm |
| NiCr | | — | 0.1 nm | 0.1 nm | 0.1 nm | 0.1 nm | 0.1 nm |
| Ag | | 7.4 | 7 nm | 7.5 nm | 7.5 nm | 7 nm | 9 nm |
| NiCr | | — | 0.1 nm | 0.1 nm | 0.1 nm | 0.1 nm | 0.1 nm |
| ZnO | | 7.5a | 10 nm | 10 nm | 10 nm | 10 nm | 10 nm |
| Si$_3$N$_4$ | | 7.5b | 20 nm | 20 nm | 35 nm | 20 nm | 19 nm |
| PVB | | 4 | 0.76 mm | 0.76 mm | 0.76 mm | 0.76 mm | 0.76 mm |
| Soda-lime glass | | 2 | 2.1 mm | 2.1 mm | 2.1 mm | 2.1 mm | 2.1 mm |

Table 1 shows layer sequences of the various examples 1 to 4 according to the invention of a laminated pane 1 and the layer sequence of a generic comparative example of a laminated pane 1. In the case of example 3 (characterized by "*"), the high-refractive layer 8.1 is not Si$_3$N$_4$, but rather SiZr$_{17}$N$_x$. FIGS. 10 to 12 show reflection spectra from the laminated pane 1 as shown in FIG. 1, in each case with a layer structure according to examples 2 to 4 according to the invention and according to the comparative example according to Table 1. The reflection spectra were simulated, wherein the simulation is emitted by a projector 9, which emits p-polarized radiation 10 of uniform intensity in the spectral range under consideration, and the inner pane 3 is irradiated at an angle of incidence relative to the interior-side surface normal of 65° (so-called interior-side reflection). The reflection simulation is thus approximated to the situation in the projection arrangement 100 from FIG. 1. For better clarity, one example is summarized in each case with the comparative example.

FIGS. 10 to 12 show that the examples according to the invention with the reflection-increasing coating 8 lead to a substantially smoother spectrum in the spectral range of interest from 380 nm to 780 nm. The reflectance of p-polarized light 10 is also greater over the entire wavelength range from 380 nm to 780 nm for examples 2 and 4 than for the comparative example. In the case of example 3, the reflectance is greater over the most important portion in the wavelength range 400 nm to 680 nm. The visual perception is thereby significantly improved for an observer. Example 4 shows that a higher reflectance over the spectral range from 380 nm to 780 nm is achieved even without the first and second refractive-index-increasing layer 7.3c, 7.3e than for the comparative example.

The average reflectance with respect to p-polarized radiation 10, the transmittance of the laminated pane 1 for visible light (380 nm to 780 nm) and the total solar energy transmission (TTS) are indicated for examples 1 to 4 according to the invention and for the comparative example in Table 2.

TABLE 2

| | Reflectance | Transmittance (TL) | Total solar energy transmission (TTS) |
|---|---|---|---|
| Example 2 | 14.7% | 71.4% | 51.1% |
| Example 3 | 13.1% | 71% | 53% |
| Example 4 | 15% | 73.5% | 51.3% |
| Comparative example | 8.6% | 73.1% | 51.6% |

The table shows the examples according to the invention and the comparative example of a laminated pane 1 with their associated measured reflectance, degrees of transmission and TTS values. As shown in Table 2, the introduction of a reflection-increasing coating 8 on the interior-side surface IV of the inner pane 3 in examples 1 to 4 leads only to a very low up to no reduction in the transmittance degree (TL) in the visible spectral range of the laminated pane 1 compared to the comparative example. At the same time, the reflectance for p-polarized radiation 10 for examples 1 to 3 is significantly increased by up to 74% relative to the comparative example. In example 4, a marginal reduction of the reflectance is observed, but the reflective layer 7 also has no first and second refractive-index-increasing layers 7.3c, 7.3e. The TTS values also remain, for the examples according to the invention, at a low value of less than 55%, whereby a pleasant ambient climate in an interior space 11 can be ensured.

LIST OF REFERENCE SIGNS

1 Laminated pane
2 Outer pane
3 Inner pane
4 Thermoplastic intermediate layer
5 First cover layer
6 Second cover layer
7 Reflective layer
7.1 First dielectric layer or layer sequence
7.1a First anti-reflective layer

7.1*b* First adjustment layer
7.2 First electrically conductive layer
7.3 Second dielectric layer or layer sequence
7.3*a* Second adjustment layer
7.3*b* Second anti-reflective layer
7.3*c* First refractive-index-increasing layer
7.3*d* Third anti-reflective layer
7.3*e* Second refractive-index-increasing layer
7.3*f* Third adjustment layer
7.4 Second electrically conductive layer
7.5 Third dielectric layer or layer sequence
7.5*a* Fourth adjustment layer
7.5*b* Fourth anti-reflective layer
8 Reflection-increasing layer
8.1 Optically high-refractive layer
8.2 Optically low-refractive layer
9 Projector
10 p-polarized radiation
11 Interior
12 External environment
100 Projection arrangement
I Outer-side surface of the outer pane 2
II Interior-side surface of the outer pane 2
III Outer-side surface of the inner pane 3
IV Interior-side surface of the inner pane 3
R Edge portion
D Display region
E Cover region
A-A' Cross section through the laminated pane 1 from FIG. 2
B-B' Cross-section through the laminated pane 1 from FIG. 4

The invention claimed is:

1. A projection arrangement, comprising:
    a laminated pane comprising an outer pane and an inner pane which are connected to one another via a thermoplastic intermediate layer, a reflective layer which is arranged between the outer pane and the inner pane in at least one display region of the laminated pane, and a reflection-increasing coating which is arranged at least within the display region on an interior-side surface of the inner pane facing away from the thermoplastic intermediate layer, and
    a projector of which the radiation is predominantly p-polarized and which is directed toward the display region and wherein the interior-side surface of the inner pane is a face of the laminated pane closest to the projector,
    wherein the reflection-increasing coating comprises at least one optically high-refractive layer having a refractive index of greater than or equal to 1.9 and at least one optically low-refractive layer having a refractive index of less than or equal to 1.6, and
    the reflective layer configured to reflect the p-polarized radiation of the projector to at least 5% and comprises, in this order, a first dielectric layer or layer sequence, a first electrically conductive layer based on silver, a second dielectric layer or layer sequence, a second electrically conductive layer based on silver and a third dielectric layer or layer sequence, wherein the reflective layer does not comprise more than two electrically conductive layers based on silver.

2. The projection arrangement according to claim 1, wherein the inner pane has a thickness of less than or equal to 1.6 mm.

3. The projection arrangement according to claim 1, wherein the optically high-refractive layer is arranged closer to the interior-side surface of the inner pane than the optically low-refractive layer.

4. The projection arrangement according to claim 1, wherein the optically low-refractive layer is formed on the basis of silicon oxide or doped silicon oxide having a geometric thickness of from 30 nm to 500 nm.

5. The projection arrangement according to claim 1, wherein the optically high-refractive layer is formed on the basis of silicon nitride, indium tin oxide, or silicon-zirconium mixed nitride having a geometric thickness of from 20 nm to 150 nm.

6. The projection arrangement according to claim 1, wherein the p-polarized radiation of the projector impinges on the laminated pane at an angle of incidence of from 50° to 75°.

7. The projection arrangement according to claim 1, wherein the reflective layer extends over at least 80% of the area of the laminated pane.

8. The projection arrangement according to claim 1, wherein the outer pane has an outer-side surface and an interior-side surface, and the outer-side surface of the outer pane faces away from the thermoplastic intermediate layer and the interior-side surface of the outer pane faces the thermoplastic intermediate layer, and wherein an opaque cover layer is applied in at least one cover region of the laminated pane on the outer-side surface or on the interior-side surface of the outer pane.

9. The projection arrangement according to claim 1, wherein the thermoplastic intermediate layer is opaque in at least one cover region of the laminated pane.

10. The projection arrangement according to claim 8, wherein the display region is at least partially covered by the cover region in a view through the laminated pane.

11. The projection arrangement according to claim 9, wherein the reflective layer is applied on an outer-side surface of the inner pane facing the thermoplastic intermediate layer, and the display region is at least partially covered by the cover region in a view through the laminated pane.

12. The projection arrangement according to claim 1, wherein the display region is located in a look-through region of the laminated pane, which region is intended to be used as a projection surface for an HUD.

13. The projection arrangement according to claim 1, wherein the first dielectric layer sequence in this order comprises at least one silicon nitride layer and a zinc oxide layer,
    the second dielectric layer sequence comprises, in this order, at least one zinc oxide layer, a silicon nitride layer, a silicon mixed nitride layer, a further silicon nitride layer, a further silicon mixed nitride layer and a further zinc oxide layer, and
    the third dielectric layer sequence comprises, in this order, at least one zinc oxide layer and one silicon nitride layer.

14. A method for producing a projection arrangement according to claim 1, comprising:
    (a) arranging an outer pane, a thermoplastic intermediate layer, a reflective layer, an inner pane and a reflection-increasing coating to form a layer stack,
    wherein the thermoplastic intermediate layer is arranged between the outer pane and the inner pane, and the reflective layer is arranged in a display region of the layer stack between the outer pane and the inner pane, and the reflection-increasing coating is arranged at least within the display region on an interior-side surface of the inner pane facing away from the thermoplastic intermediate layer,

wherein the reflection-increasing coating comprises at
least one optically high-refractive layer having a refrac-
tive index of greater than or equal to 1.9 and at least one
optically low-refractive layer having a refractive index
of less than or equal to 1.6, and
the reflective layer comprises, in this order, a first dielec-
tric layer or layer sequence, a first electrically conduc-
tive layer based on silver, a second dielectric layer or
layer sequence, a second electrically conductive layer
based on silver and a third dielectric layer or layer
sequence, and wherein the reflective layer does not
comprise more than two electrically conductive layers
based on silver,
(b) laminating the layer stack to form a laminated pane,
wherein the display region of the laminated pane also
results from the display region of the layer stack,
(c) arranging a projector, the radiation of which is pre-
dominantly p-polarized, and which is directed toward
the display region, and wherein the projector is
arranged such that the interior-side surface of the inner
pane is the face of the laminated pane closest to the
projector, wherein the reflective layer is configured to reflect the
p-polarized radiation of the projector to at least 5%.
15. A method comprising providing a projection arrange-
ment according to claim 1 in vehicles for traffic on land, in
the air, or on water.
16. The projection arrangement according to claim 1,
wherein the projection arrangement is a head-up display
(HUD) projection arrangement.
17. The projection arrangement according to claim 2,
wherein the inner pane has a thickness of less than or equal
to 1.4 mm.
18. The projection arrangement according to claim 10,
wherein the display region is arranged completely within the
cover region.
19. The projection arrangement according to claim 11,
wherein the display region is arranged completely within the
cover region.
20. The method according to claim 15, wherein the
laminated pane is a windshield.

*    *    *    *    *